(12) United States Patent
Ando et al.

(10) Patent No.: US 6,198,258 B1
(45) Date of Patent: Mar. 6, 2001

(54) DC-DC CONVERTER CAPABLE OF SOFT STARTING FUNCTION BY SLOWLY RAISING REFERENCE VOLTAGE

(75) Inventors: Hiroaki Ando; Taichi Hoshino, both of Yokohama; Kengo Adachi, Osaka, all of (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 09/557,985

(22) Filed: Apr. 25, 2000

(30) Foreign Application Priority Data

Apr. 28, 1999 (JP) .................................................. 11-121025

(51) Int. Cl.[7] ...................................................... G05F 1/10
(52) U.S. Cl. ........................... 323/222; 323/901; 323/284
(58) Field of Search .................................. 323/222, 901, 323/283, 284, 288

(56) References Cited

U.S. PATENT DOCUMENTS

| | | | |
|---|---|---|---|
| 5,247,239 | * | 9/1993 | Yamamura et al. ................... 323/222 |
| 5,264,782 | * | 11/1993 | Newton ................................. 323/222 |
| 5,959,439 | * | 9/1999 | Shenai et al. ......................... 323/222 |

FOREIGN PATENT DOCUMENTS

| | | |
|---|---|---|
| 2-197253 | 8/1990 | (JP) . |
| 3-285296 | 12/1991 | (JP) . |
| 5-76167 | 3/1993 | (JP) . |
| 6-121528 | 4/1994 | (JP) . |
| 6-250747 | 9/1994 | (JP) . |
| 7-298614 | 11/1995 | (JP) . |
| 9-308226 | 11/1997 | (JP) . |

* cited by examiner

*Primary Examiner*—Shawn Riley
(74) *Attorney, Agent, or Firm*—Morgan, Lewis & Bockius LLP

(57) ABSTRACT

A DC-DC converter includes an oscillation circuit for oscillating at a predetermined frequency and generating a pulse with a predetermined pulse width, a reference voltage generating circuit for generating a reference voltage, means mounted in the reference voltage generating circuit for slowly rising the reference voltage, a switching circuit for chopping the current inputted from a DC primary electric power source in accordance with the pulse, and feedback control means for stopping/restarting the oscillation of the oscillation circuit on the basis of the voltage that the output of the switching circuit is smoothed and including the reference voltage with a detection voltage upon stopping control, so that the DC-DC converter having a soft starting function is provided with a simple structure and a compact size without utilizing a PWM circuit and a VCO.

27 Claims, 2 Drawing Sheets

DC-DC CONVERTER CAPABLE OF SOFT STARTING FUNCTION BY SLOWLY RAISING REFERENCE VOLTAGE

BACKGROUND OF THE INVENTION

The present invention relates to a DC-DC converter of the chopper type, and more particularly to a DC-DC converter provided with soft starting function suitable for minimizing its size and reducing its manufacturing cost. The DC-DC converter of this type is suitable to be used for an electric power source or the like of portable devices adapted to be operated by a battery, and further it is suitable to drive an electromagnetic relay, a compact electric motor, an EL (Electro-Luminescence) or the like through a battery.

Hitherto, there are known a DC-DC converter provided with a soft starting circuit for the purpose of a restriction or the like for a rush current (JP-A-5-76167), and a DC-DC converter provided with not only a soft starting circuit but also an over current detection circuit (JP-A-7-298614). A PWM (Pulse Width Modulation) system for varying the width of a pulse for controlling a switching operation and a PFM (Pulse Frequency Modulation) system for varying the switching frequency are a precondition for those DC-DC converters.

Moreover, there is known a reference voltage generating circuit suitable to be easily structured by IC elements, which utilizes the band gap voltage power source with a precise voltage output but an insufficient output current. Such reference voltage generating circuit 5, as shown in FIG. 4, is structured so that the reference voltage Vref generated by a band gap voltage power source 5a is amplified for current by a voltage follower 5b or the like in order to supply it to necessary circuits.

In contrast, since there is a boundary of minimizing the size and decreasing the manufacturing cost for the conventional DC-DC converters in which PWM and PFM are made precondition because of complexities of its circuit structure and its adjusting operation, there is presented by the same applicant as the present application, Japanese Application No. 10-322720 of the type (referred to as an oscillation stopping/restarting type hereinafter) in which the oscillation of an oscillation circuit for generating a fixed frequency is stopped suitably. According to the type, it is only sufficient to adapt an operation property of the circuit to a switching condition utilizing a predetermined frequency thereby enabling PWM and VCO unnecessary.

Namely, as shown in FIG. 3, for the purpose of boosting or decreasing an input voltage Vin from a DC primary electric power source 1 to a desired output voltage Vo to be supplied to a load 4 connected to a smoothing circuit 3, the DC-DC converter 2 of the oscillation stopping/restating type is composed of an oscillation circuit 2c for oscillating a predetermined frequency and generating a pulse signal A with a predetermined pulse width, a switching circuit 2b for chopping the inertia current I flowing into an inductance element section 2a on the basis of the input voltage Vin from the DC primary electric power source 1, in accordance with the pulse signal A, and a feedback control circuit 2d for generating a feedback control signal B on the basis of the output voltage Vo obtained by smoothing the output from the switching circuit 2b, and feeding it to the oscillation circuit 2c thereby stopping/restarting the oscillation.

However, in the case where it is tried to provide a soft starting function for the DC-DC converter having the above-mentioned structure, it is difficult to adopt the conventional measure as it were and further it is not easy to provide the soft starting function therefor, because a switching control type as a premise is different form each other, Therefore, it is a technical problem as to how the function for preventing and controlling the rush current and the over current is provided for the DC-DC converter of the oscillation stopping/restarting type.

SUMMARY OF THE INVENTION

The object of the present invention is to solve the technical problem as mentioned above, and to present a DC-DC converter having a simple structure and enabling a soft starting operation.

The DC-DC converter invented as a first solving means, which is made for the purpose of solving the conventional technical problem is composed of an oscillation circuit for oscillating a predetermined frequency and sequentially generating a pulse having a predetermined pulse width with the predetermined frequency if it is in a free running state, a switching circuit for chopping the current inputted from the Dc primary electric power source in accordance with the pulse, and feedback control means for stopping/restarting the oscillation of the oscillation circuit on the basis of the voltage that the output of the switching circuit is smoothed by a smoothing circuit which is installed within the system or the outside, wherein the operation of the oscillation circuit is controlled to stop so that the feedback control circuit compares the detected voltage with the reference voltage, and further means for slowly rising the reference voltage is provided within the reference voltage generating circuit for generating the reference voltage.

According to such DC-DC converter, the oscillation circuit for sequentially oscillating the pulse having a predetermined pulse width and with a predetermined frequency in the independent state in which no feedback signal is applied thereto, a feedback signal is applied to the oscillation circuit and the feedback signal is utilized for the switching circuit without modulating the oscillation signal and further the feedback to the oscillation circuit is performed by the voltage that the output is smoothed thereby enabling the oscillation of the oscillation circuit to be stopped and restarted, and therefore the frequency of the switching circuit becomes similar to that of PFM even if PWM and VCO are not used, thereby maintaining a suitable output.

Moreover, since the current inputted from the DC primary electric power source is chopped by the switching circuit and the switching control is performed in accordance with the pulse having a predetermined pulse width and a predetermined frequency from the oscillation circuit. Therefore, such switching operation is restored to the original state at a constant period corresponding to the pulse width in a normal condition, the switching condition is fixed substantially even if the switching system is similar to the PFM system.

As a result, the switching condition suitable to the operation property of the switching circuit or the like is established completely prior to a decision of the load condition, and therefore it becomes easy to design the system. Moreover, since PWM and VCO are unnecessary, the circuit construction becomes to be simple and the operation of the circuit becomes to be stable.

Moreover, when the output voltage is detected by the feedback control means, the detected voltage is compared with the reference voltage and further the stopping control of the oscillation circuit is performed on the basis of the result of the comparison. Therefore, since the reference voltage is adapted to be risen slowly, the feedback operation is achieved such that the output voltage is also increased slowly as the reference voltage rises slowly. Therefore, during some period from energization of the electric power source, namely during the transitional period until the reference voltage reaches a constant value, the stopping control for the oscillation circuit is performed more frequently than usual state, and therefore the chopped current is restricted from abrupt increment thereby slowly increasing to a normal state. The slow rise of the reference voltage is thus achieved, and its slow rise is achieved by a simple and local modification of the circuit such that a capacitance element or the like is added into the reference voltage generating circuit thereby restricting complexity of circuit to minimize extent.

As a result, there is presented a DC-DC converter provided with a soft starting function with maintaining the property that the PWM and VCO circuits are not necessary and it is easy to make the converter with a simple and compact structure.

Therefore, according to the present invention there is presented a DC-DC converter provided with a soft starting function with a simple and compact structure.

The DC-DC converter invented as a second solving means, which is made for the purpose of solving the conventional technical problem is composed of, in a DC-DC converter invented as a first solving means, an over-current detection circuit provided for the switching circuit for detecting as to whether the current flowing into the switching circuit exceeds over a predetermined threshold value which is corresponding to the over-current or not, and the means provided between the oscillation circuit and the feedback control circuit & the over-current detection circuit, for stopping/restarting the oscillation of the oscillation circuit in accordance with the detection output of the over-current detection circuit in addition to the control of the feedback control means.

According to such DC-DC converter, by means of the over-current detection circuit is installed within the switching circuit or attached thereto, the detection as to whether the switching current flowing into the switching circuit exceeds over a predetermined threshold value or not is performed, namely it is detected as to whether the switching circuit is likely to a over-current state or not. Then, if the state of the switching circuit is likely to a over-current was detected, the stop control of the oscillation circuit is performed through the stopping/restarting means, as is similar to the stopping/restarting of the oscillation performed by the control of the feedback control means. Moreover, such the stopping/restarting means may be realized by utilizing a simple logic circuit or the like. As mentioned above, the detection for the over-current can be directly realized on the basis of the switching current merely by attaching a simple circuit, and further the control for stopping the oscillation circuit is performed in accordance with the detection result of the over-current.

As a result, such over-current is surely avoided even in the case where a variation or the like of load which is exceed over assumption causes during not only the starting time but also its operation. Moreover, in this case there is not formed a coalition between the condition of the soft starting and the condition of the over-current detection, and therefore it is easily achieved to faithfully change a design in accordance with different specifications even when required specifications for voltage and current given or to be supplied are different from each other for each of applications.

Therefore, according to the present invention there is presented a DC-DC converter with a simple structure in which a soft starting and a prevention of over-current during its operation are possible.

DETAILED DESCRIPTION OF THE PREFERRED EMBODIMENTS

Referring now to Figures a first and a second preferable embodiments of a DC-DC converter of the present invention will be specifically described hereinafter.

Figure 1A:
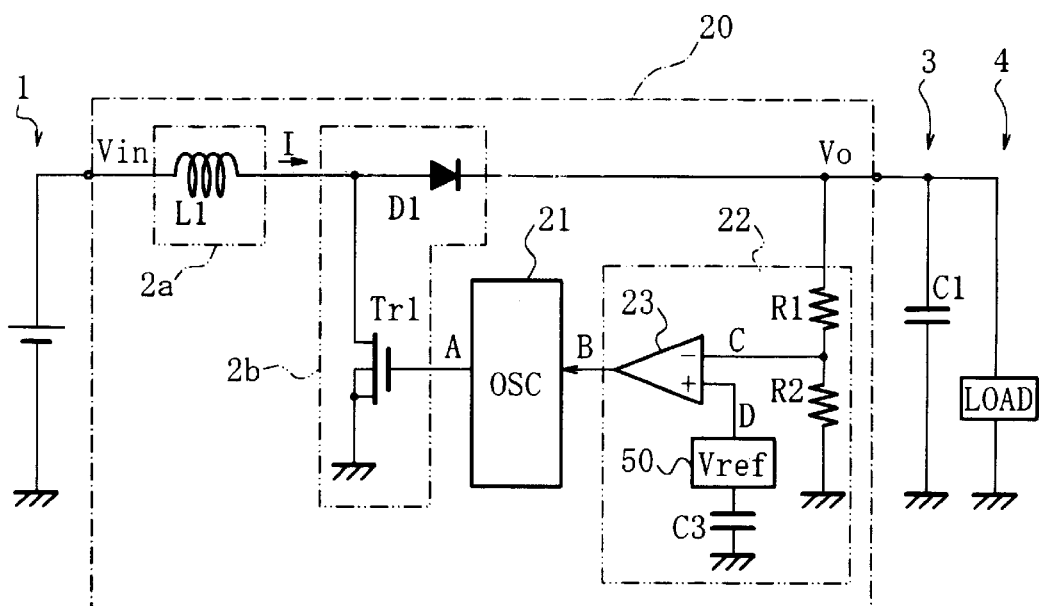
FIG. 1A is a schematic circuit diagram showing the entire structure of a first embodiment of a DC-DC converter of the present invention.
Figure 1B:
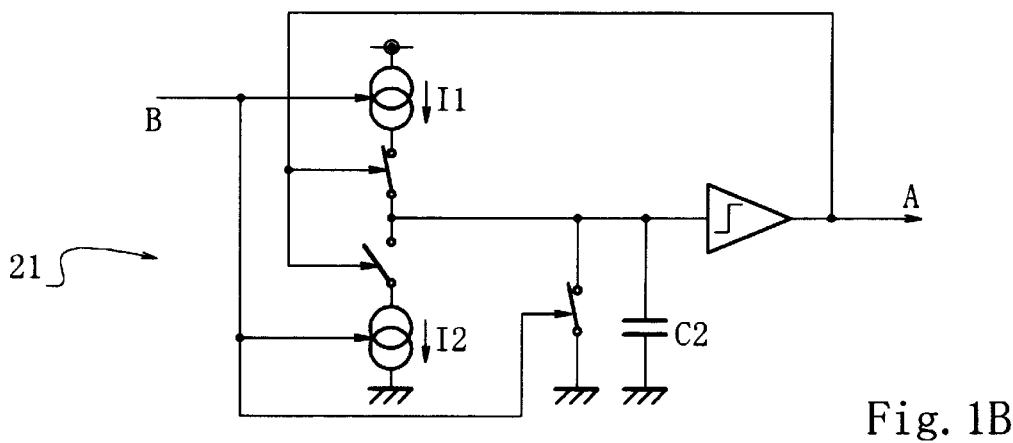
FIG. 1B is a detailed circuit diagram showing the oscillation circuit in the first embodiment of a DC-DC converter of the present invention.
Figure 1C:
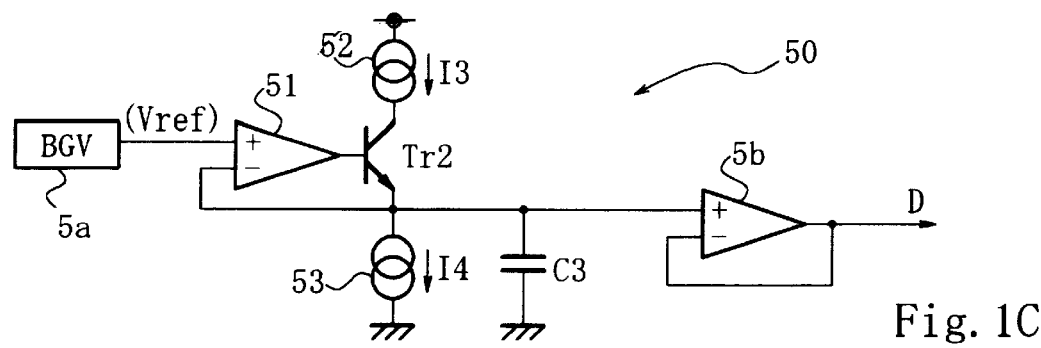
FIG. 1C is a detailed circuit diagram showing the reference voltage generating circuit in the first embodiment of a DC-DC converter of the present invention.
Figure 2:
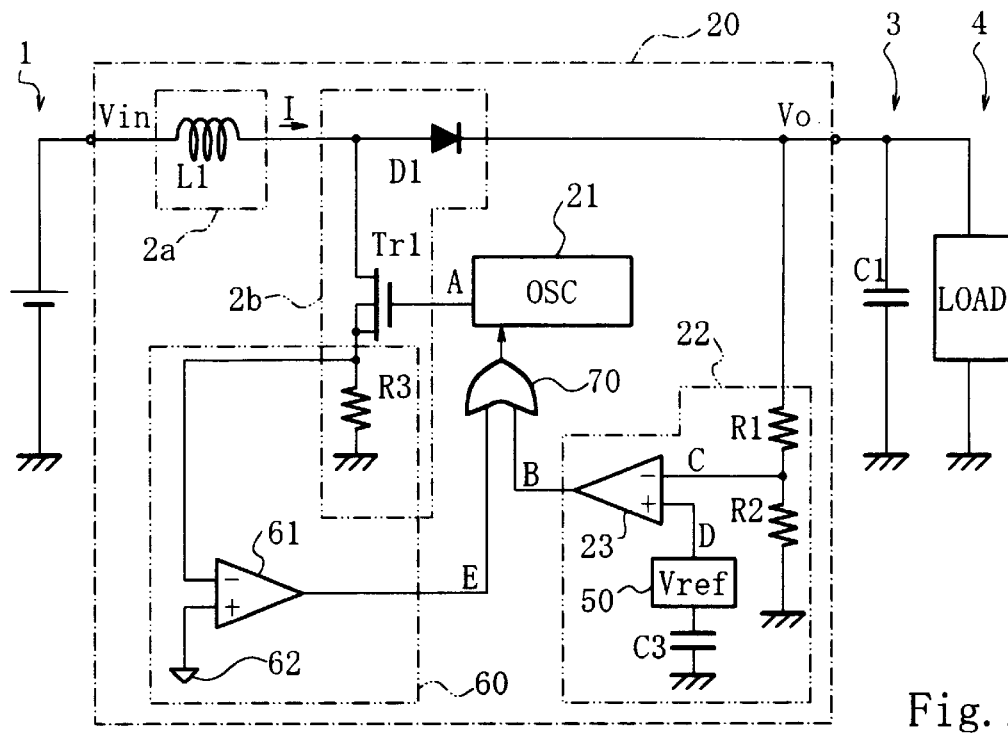
FIG. 2 is a schematic circuit diagram showing the entire structure of a second embodiment of a DC-DC converter of the present invention.
Figure 3:
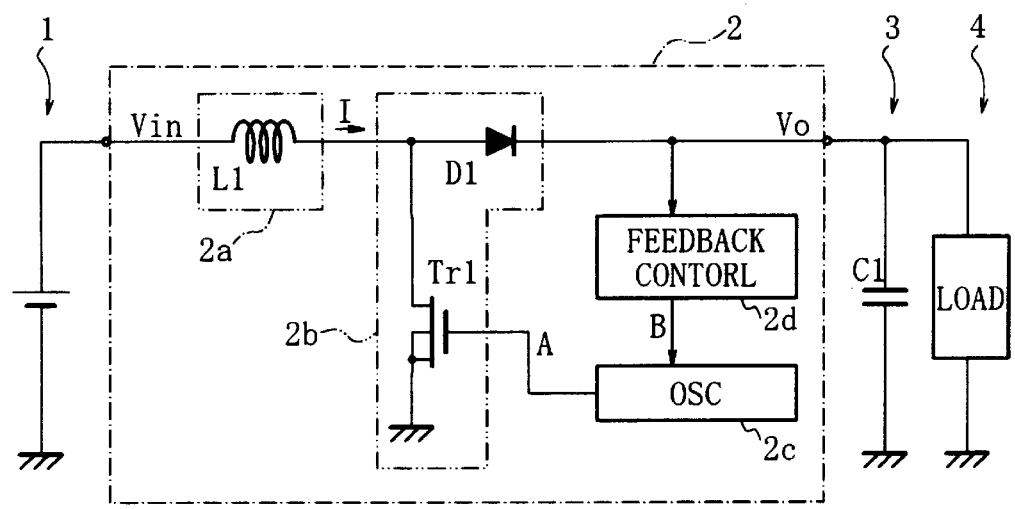
FIG. 3 is a schematic circuit diagram showing the entire structure of a DC-DC converter as a fundamental structure of the present invention.

The above-mentioned first solving means is realized by the first embodiment as shown in FIGS. 1A, 1B, and 1C, and the second solving means is realized by the second embodiment as shown in FIG. 2.

The structure of the DC-DC converter as the first embodiment of the present invention will be specifically described with reference to figures hereinafter. FIG. 1A shows an entire circuit, FIG. 1B shows an oscillation circuit, and FIG. 1C shows a reference voltage generating circuit.

As shown in FIG. 1A, the circuit composed of a DC primary electric power source 1 for supplying the electric power of, for example, about 3 volts, which may be a disposal cell, a chargeable cell or the like, a DC-DC converter 20 of the chopper type for booting an input voltage Vin to the output voltage Vo, for example 15 volts, a smoothing circuit 3 for stabling the output voltage Vo of the DC-DC converter 20, and a load 4 for being operated by the output voltage, for the purpose of operating the load 4 by converting the voltage of the electric power source into a suitable voltage even if the load 4 does not operate by the voltage of the cell.

The load 4 is different in accordance with applications, and a typical one of them is a motor driving circuit for driving, for example, an electric motor which provides a power transistor or the like for controlling a motor driving current, and the motor driving current is supplied from the output voltage Vo of the DC-DC converter 20.

The smoothing circuit 3 is composed of a condenser C1 connected to the output line of the DC-DC converter 20 to be connected also to the load 4, and there is used for the condenser C1 an electrolytic condenser or the like as an independent element, which has a large capacity enough for stabling the output voltage Vo.

The DC-DC converter 20 is formed as a hybrid module in which an inductance element section 2a and an one tip IC are installed on a common substrate. There is used for the inductance element section 2a a coil L1 with, for example, 47μH connected in series with the line of the input voltage Vin. Moreover, the one chip IC includes other integrated circuits on one silicon chip, specifically a switching circuit 2b, an oscillation circuit 21 and a feedback control circuit 22.

The switching circuit 2b is composed of a transistor Tr1 and a diode D1, and mounted on the series line of electric current supply from the DC primary electric power source 1 to the load 4 through the inductance element section 2a and the smoothing circuit 3. The anode of the diode D1 is connected to the line of the input voltage Vin, and the cathode of the diode D1 is connected to the line of the output voltage Vo so that the inertia current I supplied from the inductance element section 2a to the smoothing circuit 3 does not flow in reverse. Schottky diode having less voltage loss is positively used for the diode D1. Moreover, MOS transistor or the like which can drive several hundred milliampere, for example, 200 mA is used for the transistor Tr1, and the source and the drain of the transistor Tr1 are connected to the anode side of the diode D1 and the ground or a reference line respectively and the gate thereof is connected to the line of the pulse signal A.

In case of OFF state of the transistor Tr1, the transistor does not influence the line of the inertial current I, and therefore the inertia current I passed through the coil L1 from the DC primary electric power source 1 flows into the smoothing circuit 3 through the diode D1 and the line of the output voltage Vo. In contrast, if the pulse signal A becomes effective, namely when the pulse signal A is received by the gate, the transistor Tr1 is switched from the OFF state to the ON state thereby bypassing the inertia current I to the ground line. Upon no pulse, the transistor Tr1 is restored to the OFF state. Thus, the switching circuit 2b performs the chopping operation for chopping the current inputted from the DC primary electric power source 1 in accordance with the pulse of the pulse signal A.

The oscillation circuit may be structured by the circuit (as disclosed in the publication No. JP-A-10-322720) which is composed of a plurality of NOT gates and buffers connected in series, however the oscillation circuit is composed of, as shown in FIG. 1B, a condenser C2 used for charge and discharge, a constant current circuit for effecting the charge thereof with a constant current I1, a constant current circuit for effecting the discharge thereof with a constant current I2, and a binary circuit composed of a buffer with hysteresis, a comparator or the like, for cording the voltage of the condenser C2 changed by the charge and discharge thereof with a predetermined threshold value, so that the design of the charge and discharge time constant for defining the oscillation frequency and the pulse width becomes easy. The binary signal is outputted as the pulse signal A and used for controlling switch circuits inserted into the charge and discharge line of the constant current I1 and I2. By this, the oscillation circuit 21 oscillates a predetermined frequency and sequentially generates the predetermined frequency with a predetermined pulse width, if it is in a free running state.

Moreover, the oscillation of the oscillation circuit 21 is adapted to be stopped and restarted in accordance with the feedback control signal B in such a manner that both constant current circuits receive the feedback control signal B as a control signal to stop and restart the outputs of the constant currents I1 and I2 in accordance with the condition that the feedback control signal B is effective or not. Moreover, in order to achieve a quick response to the request of oscillation stop, there is provided a switch circuit in parallel with the condenser C2 thereby instantaneously discharging the capacity stored in the condenser C2. The switch circuit is also controlled through the feedback control signal B.

The feedback control circuit 22 is provided for the purpose of generating the feedback control signal B for stopping/restarting the oscillation of the oscillation circuit 21, and composed of a resistive potential divider circuit composed of a series of resistors R1 and R2 inserted between the line of the output voltage Vo and the reference line of the ground or the like, for generating the detection voltage C by dividing the output voltage Vo through the resistivity thereof, a reference voltage generating circuit 50 which will be described hereinafter, for generating a predetermined reference voltage D, and a comparing circuit 23 composed of a comparator or the like for generating the feedback control signal B by inputting the detection voltage C and the reference voltage D and comparing the detection voltage C with the reference voltage D so that the generation of the feedback control signal B is performed on the basis of the output voltage Vo, namely on the basis of the output voltage Vo that the output of the switching circuit 2b is smoothed by the smoothing circuit 3 attached to the DC-DC converter 20. When the detection voltage C exceeds over the reference voltage D, the oscillation of the oscillation circuit 21 is stopped, on the other hand in the reverse case the oscillation is restarted thereby generating the feedback control signal B.

Figure 4:
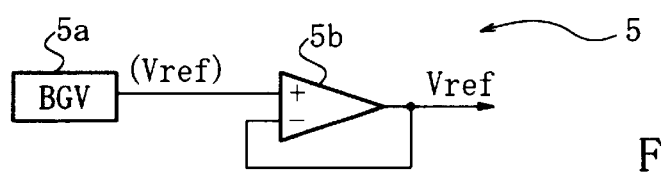
FIG. 4 is a detailed circuit diagram showing the reference voltage generating circuit in a conventional DC-DC converter.

The reference voltage generating circuit 50, as shown in FIG. 1c, includes the band gap voltage source 5a and the voltage follower 5b in order to generate the reference voltage D with a constant value in a normal state as is similar to the conventional reference voltage generating circuit 5 as shown in FIG. 4, and further there is provided a condenser C3 one end of which is connected to the connection line between the band gap voltage source 5a and the voltage follower 5b, and the other end of which is connected to the reference line of the ground or the like, for the purpose of achieving a slow raise of the reference voltage D in the transitional period immediately after the energization of the electric power source. In addition to the condenser C3, there are provided for the purpose of the charge and discharge of the condenser C3, a constant current circuit 53 for discharging the capacity of the condenser C3 with a constant current I4, a constant current circuit 52 for charging it with the larger current than that of the constant current circuit 53, and a difference amplifier circuit 51 for driving a transistor Tr2 in accordance with the difference between the voltage of the condenser C3 and the output voltage Vref of the band gap voltage source 5a.

According to the circuit 50, the output of the constant current circuit 52 is restricted or released by the transistor Tr2 inserted into the charging line from the constant current circuit 52 to the condenser C3, and therefore its charging is performed with the difference voltage (I3–I4) when the voltage of the condenser C3 is below the voltage Vref, and when the voltage of the condenser C3 is balanced with the voltage Vref at which the charge thereof is balanced with the discharge thereof, the stable condition that the voltage of the condenser C3 is consistent with the voltage Vref, is maintained. According to the circuit thus structured, not only the inclination and the shaping time or the like with respect to the risen waveform of the reference voltage D can be clearly decided on the basis of the difference voltage (I3–I4) and the capacity of the condenser C3, but also it is achieved to enable the reference voltage D more stable than the conventional case by the combination of the condenser C3 having smoothing function and the transistor Tr2 for normally maintaining the active state by the idling current 14.

The first embodiment of the DC-DC converter will be described with respect to its utilization and its operation hereinafter. In this case, if the electric power supply from the Dc electric power source 1 to the DC-DC converter 20 is started by the actuation of an electric power switch which is not shown, at first a soft starting thereof is effected and then it becomes its stable state as follows.

When the input voltage Vin raises, the inertia current I through the coil L1 is gradually increased. Moreover, the oscillation circuit 21 oscillates a constant frequency and the pulse signal A becomes the signal including a constant period and a constant pulse width. Upon existence of the pulse, the inertia current I is bypassed by the transistor Tr1 to the ground side to energizing it. On the other hand, upon absence of the pulse, the inertia current I loses the bypass through the transistor Tr1 thereby boosting it, and if its voltage is increased over the output voltage Vo, the current flows into the condenser C1 through the diode D1.

Then, by repeating such operations the output voltage Vo is try to increase toward a predetermined target value (D×(R1+R2)/R2) but the reference voltage D hardly rises initially thereby enabling the feedback control signal B effective frequently and therefore interrupting the oscillation of the oscillation circuit 21 frequently. Due to each interruption of the oscillation, the pulse of the pulse signal A is missed or becomes one with narrow width, whereby the inertia current I hardly energized and therefore both of the inertia current I and the output voltage Vo are slowly risen in accordance with the slow rise of the reference voltage D.

As mentioned above the soft starting function is achieved, if the reference voltage D reaches the output voltage Vref of the band gap voltage source 5a, a normal state thereof is obtained. In this normal state, if the maximum current to be supplied is almost consumed because of a heavy load 4, the condition in which the detection voltage C of the output voltage Vo exceeds over the reference voltage D is almost never caused, whereby it is a rare chance that the feedback control signal B stops the oscillation of the oscillation circuit 21. In contrast, if the electric consumption is reduced because of a light load 4, though the output voltage Vo has a slight pulsation, the output voltage Vo is gradually increased, whereby the detection voltage C exceeds over the reference voltage D, the feedback control signal B becomes effective, and the oscillation of the oscillation circuit 21 is stopped.

Then, if the inertia current I decreases and the output voltage Vo returns to the target value, the feedback control signal B becomes ineffective thereby restarting the oscillation of the oscillation circuit 21.

As mentioned above, in the normal state the stopping/restarting of the oscillation circuit 21 is repeated with the frequency in accordance with the condition of the load 4 thereby suitably skipping the pulses of the pulse signal A and therefore maintaining the output voltage Vo to a constant value (Vref×(R1+R2)/R2)) substantially.

Moreover, in the case where the switching property on the basis of the transistor Tr1 and the coil L1 is different because of the difference of the load 4, it may be possible to reset the oscillation frequency and the pulse width of the oscillation circuit 21, and further in the of different output voltage Vo, it may be possible to reset the values of the resistors R1 and R2 or the reference voltage D. Moreover, in the case where it is desired to change the condition of the soft start function, it may be possible to modify the constant current I3 and I4 and the capacity of the condenser C3, whereby it is easily achieved to adapt the parts to different conditions of operation.

Referring now figures the specific structure of a second embodiment of the DC-DC converter of the present invention will be described hereinafter. FIG. 2 is a view showing an entire circuit diagram corresponding to FIG. 1A.

In the DC-DC converter 20 as shown in FIG. 2, the difference from that in the above FIG. 1A is the point that an over current detection circuit 60 and a logic circuit 70 are added thereinto.

The over current detection circuit 60 is composed of a resistor R3 connected in series with the bypass line of the inertia current I due to the transistor Tr1, for generating the voltage corresponding to the inertia current I, and a comparator 61 for generating an over current detection signal E by comparing the predetermined threshold value generated by a threshold voltage generating circuit 62 and the detection voltage due to the resistor R3, whereby the over current detection signal E is effective when the detection voltage exceeds over the threshold value. Namely, the over current detection circuit is mounted with respect to the switching circuit 2b for detecting as to whether the over current I exceeds over the predetermined threshold value corresponding to the over current or not.

The logic circuit 70 is an OR gate inputting the feedback control signal B and the over current detection signal E, and its output is applied to the oscillation circuit 21 in place of the feedback control signal B in FIG. 1A. By this, if at least one of the feedback control signal B and the over current detection signal E becomes effective, the oscillation of the oscillation circuit 21 is stopped. Such logic circuit 70 which is made simple and is mounted between the oscillation circuit 21 and a feedback control means 22 & the over current detection circuit 60 for the purpose of stopping/restarting the oscillation of the oscillation circuit 21 in response to the detection signal E of the over current detection circuit 60 in addition to the feedback control signal B of the feedback control means 22.

The utilization and its operation of the second embodiment of the DC-DC converter will be described hereinafter.

The DC-DC converter 20 can operate as is similar to the above mentioned case in spite of the transitional state and the normal state, because the over current detection signal E does not become effective until the inertia current I increases to the over current.

On the other hand, if the inertia current reaches the over current state, the voltage generated at both ends of the resister R3 exceeds over the threshold voltage from the threshold voltage generating circuit 62 in spite of the transitional state and the normal state, and therefore the over current detection signal E becomes effective by the comparator 61 thereby stopping the oscillation of the oscillation circuit 21. Then, if the inertia current I is restored at the normal state, the over current detection signal E is also restored thereby restarting the oscillation of the oscillation circuit 21.

As mentioned above, the over current can be detected thereby surely preventing the over current, in spite of a transitional state or normal state.

In the case where it is desired to change a detection reference by which the over current state is discriminated from the normal state in accordance with the properties or the like the transistor Tr1 and the coil L1, it may be sufficient to change the value of resistance the resistor 3 and/or the threshold value of the threshold value voltage generating circuit 62. In the case, there is no any trouble such that the condition enabling the soft starting function is influenced thereby being deviated due to the setting of the feedback control circuit 22 side. Moreover, there is no any trouble such that the condition enabling the detection of the over current detection circuit 60 side is influenced thereby being deviated due to the change of the feedback control circuit 22 side. Therefore, it is easily achieved to adapt the circuit to different conditions.

By the way, according to the above-mentioned embodiments there is used MOS transistor as the transistor Tr1, however the present invention should not be limited to it, it may be a voluntary type of transistor such as bipolar transistor, transistors connected in parallel with each other, or transistors with Darlington connection. Moreover, the pulse signal A for controlling the switching operation is directly inputted into the gate or the like of the transistor Tr1 in the above-mentioned embodiments, however the pulse signal A may be inputted into the gate through a logically inverting element or a level shift circuit or the like, in accordance with the property of transistor such as PMOS, NMOS, an enhancement type, or a depression type, and further in accordance with that the output of the oscillation circuit 21 is a positive logic or a negative logic.

Moreover, since the output voltage Vo is decided on the basis of the property of the load 4, it should not be limited to 15 volts, and it may be 12V, 18V or more higher or lower values than them.

Moreover, the smoothing circuit 3 should not be the type to be attached to the converter, it may be integrally installed within a hybrid module of the DC-DC converter 20.

In brief, as mentioned above according to the DC-DC converter as a first solving means of the present invention, the oscillation circuit for oscillating a fixed frequency is controlled to stop in accordance with the result of comparing the detection voltage with the reference voltage, and further the reference voltage is adapted to be risen slowly, and therefore the slow starting function is performed without disturbing such characteristics that the DC-DC converter is provided with a simple structure and a compact size without utilizing PWM circuit and VCO.

Moreover, according to the DC-DC converter as a second solving means of the present invention, the over current detection is directly performed on the basis of the switching current, and further the oscillation circuit can be controlled to be stopped on the basis of the result of detection result, and therefore the over current can be surely avoided even if unexpected variation of load or the like is caused not only at the starting time but also during operation, and further it is easily achieved to modify the design for each application so that there is no coalition between the condition for enabling the soft starting and the condition for detecting the over current.

What is claimed is:

1. A DC-DC converter comprising:
    an oscillation circuit for oscillating a predetermined frequency and generating a pulse with a predetermined pulse width;
    a reference voltage generating circuit for generating a reference voltage;
    means mounted in said reference voltage generating circuit for slowly rising said reference voltage;
    a switching circuit for chopping the current inputted from a DC primary electric power source in accordance with said pulse; and
    feedback control means for stopping/restarting the oscillation of said oscillation circuit on the basis of the voltage that the output of said switching circuit is smoothed and further comprising said reference voltage with a detection voltage upon stopping control.

2. A DC-DC converter according to claim 1, wherein there is provided in said switching circuit an over current detection circuit for performing a detection as to whether the current of said switching circuit exceeds over a predetermined threshold value according to an over current or not.

3. A DC-DC converter according to claim 2, wherein stopping/restarting means is mounted between said oscillation circuit and said feedback control means & said over current detection circuit, for stopping/restarting the oscillation of said oscillation circuit in accordance with the detection of said over current detection circuit in addition to the control of said feedback control means.

4. A DC-DC converter according to claim 3, wherein stopping/restarting means includes a logic circuit.

5. A DC-DC converter according to claim 1, wherein said switching circuit is composed of a transistor and a diode, and is controlled by the output from said oscillation circuit.

6. A DC-DC converter comprising:
    an oscillation circuit for oscillating at a predetermined frequency and generating a pulse with a predetermined pulse width;
    feedback control means for stopping/restarting the oscillation of the oscillation circuit by inputting a feedback control signal to the oscillation circuit; and
    a switching circuit for chopping current inputted from a DC primary electric power source in accordance with the pulse from the oscillation circuit,
    wherein the feedback control means includes a reference voltage generating circuit for generating a reference voltage and means for slowly raising the reference voltage connected between the reference voltage generating circuit and ground.

7. The DC-DC converter according to claim 6, wherein the oscillation circuit includes a condenser, a first constant current circuit for charging the condenser, a second constant current circuit for discharging the condenser, and a buffer with hysteresis.

8. The DC-DC converter according to claim 6, wherein the means for slowly raising the reference voltage includes a condenser.

9. The DC-DC converter according to claim 8, wherein the reference voltage generating circuit includes: a band gap voltage source; a first constant current circuit for discharging the condenser with a first current; a second constant current circuit for charging the condenser with a second current; a transistor connected between the first constant current circuit and the second constant current circuit; and a difference amplifier circuit for driving the transistor in accordance with a difference between a voltage of the condenser and an output voltage of the band gap voltage source.

10. The DC-DC converter according to claim 9, wherein the second current is larger than the first current.

11. The DC-DC converter according to claim 9, wherein the reference voltage generating circuit further includes a voltage follower connected to the condenser.

12. The DC-DC converter according to claim 6, wherein the feedback control means further includes a resistive potential divider circuit including a series of resistors connected between an output of the switching circuit and ground for generating a detection voltage, and a comparing circuit for generating the feedback control signal by comparing the detection voltage and the reference voltage.

13. The DC-DC converter according to claim 12, wherein the oscillation of the oscillation circuit is stopped when the detection voltage exceeds the reference voltage.

14. The DC-DC converter according to claim 6, wherein the feedback control signal is generated on the basis of an output voltage that is an output of the switching circuit which is smoothed by a smoothing circuit attached to the DC-DC converter.

15. The DC-DC converter according to claim 6, further comprising an over current detection circuit including a resistor connected to a transistor in the switching circuit, a threshold voltage generating circuit for generating a threshold voltage, and a comparator for generating an over current detection signal by comparing an over current detection voltage generated due to the resistor connected to the transistor in the switching circuit and the threshold voltage.

16. The DC-DC converter according to claim 15, wherein the over current detection signal becomes effective when the detection voltage exceeds the threshold voltage.

17. The DC-DC converter according to claim 15, further comprising stopping/restarting means for receiving the feedback control signal and the over current detection signal as inputs and outputting a signal to the oscillation circuit.

18. The DC-DC converter according to claim 17, wherein the stopping/restarting means includes a logic circuit.

19. The DC-DC converter according to claim 17, wherein the stopping/restarting means stops the oscillation of the oscillation circuit when at least one of the feedback control signal and the over current detection signal becomes effective.

20. The DC-DC converter according to claim 15, wherein the feedback control means further includes a resistive potential divider circuit including a series of resistors connected between an output of the switching circuit and ground for generating a detection voltage, and a comparing circuit for generating the feedback control signal by comparing the detection voltage and the reference voltage.

21. A DC-DC converter comprising:
    an oscillation circuit for oscillating at a predetermined frequency and generating a pulse with a predetermined pulse width;
    feedback control means for stopping/restarting the oscillation of the oscillation circuit by inputting a feedback control signal to the oscillation circuit, including a reference voltage generating circuit for generating a reference voltage and means for slowly raising the reference voltage connected between the reference voltage generating circuit and ground; and
    a switching circuit for chopping current inputted from a DC primary electric power source in accordance with the pulse from the oscillation circuit;
    an over current detection circuit including a resistor connected to a transistor in the switching circuit, a threshold voltage generating circuit for generating a threshold voltage, and a comparator for generating an over current detection signal by comparing an over current detection voltage generated due to the resistor connected to the transistor and the threshold voltage; and
    stopping/restarting means for receiving the feedback control signal and the over current detection signal as inputs and providing an output to the oscillation circuit.

22. The DC-DC converter according to claim 21, wherein the feedback control means further includes a resistive potential divider circuit including a series of resistors connected between an output of the switching circuit and ground for generating a detection voltage, and a comparing circuit for generating the feedback control signal by comparing the detection voltage and the reference voltage.

23. The DC-DC converter according to claim 21, wherein the reference voltage generating circuit includes: a band gap voltage source; a first constant current circuit for discharging the means for slowly rising the reference voltage with a first current; a second constant current circuit for charging the means for slowly rising the reference voltage with a second current; a transistor connected between the first constant current circuit and the second constant current circuit; a difference amplifier circuit for driving the transistor connected between the first constant current circuit and the second constant current circuit in accordance with a difference between a voltage of the means for slowly rising the reference voltage and output voltage of the band gap voltage source.

24. A circuit comprising:
    an electric power source for supplying an electric power;
    a DC-DC converter having an input connected to the electric power source, and an output; and
    a load connected to the output of the DC-DC converter;
    wherein the DC-DC converter comprises:
        an inductance element section connected to the input;
        a switching circuit for chopping current inputted from the electric power source through the inductance element section in accordance with the pulse from the oscillation circuit;
        an oscillation circuit for oscillating at a predetermined frequency and generating a pulse with a predetermined pulse width; and
        feedback control means for stopping/restarting the oscillation of the oscillation circuit by inputting a feedback control signal to the oscillation circuit,
        wherein the feedback control means includes a reference voltage generating circuit for generating a reference voltage and means for slowly raising the reference voltage connected between the reference voltage generating circuit and ground.

25. The circuit according to claim 24, wherein the DC-DC converter further comprises an over current detection circuit including a resistor connected to a transistor in the switching circuit, a threshold voltage generating circuit for generating a threshold voltage, and a comparator for generating an over current detection signal by comparing an over current detection voltage generated due to the resistor connected to the transistor in the switching circuit and the threshold voltage.

26. The circuit according to claim 25, wherein the DC-DC converter further comprises stopping/restarting means for receiving the feedback control signal and the over current detection signal as inputs and outputting a signal to the oscillation circuit.

27. The circuit according to claim 24, further comprising a smoothing circuit connected to the output in parallel with the load for stabilizing the output of the DC-DC converter.

* * * * *